United States Patent
Taneja et al.

(10) Patent No.: US 11,683,707 B2
(45) Date of Patent: *Jun. 20, 2023

(54) CITIZEN BROADBAND RADIO SERVICE (CBRS) NETWORK PERFORMANCE WHILE TAKING INTO ACCOUNT PRIVACY PREFERENCES

(71) Applicant: Cisco Technology, Inc., San Jose, CA (US)

(72) Inventors: Mukesh Taneja, Bangalore (IN); Indermeet Singh Gandhi, Bangalore (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/478,209

(22) Filed: Sep. 17, 2021

(65) Prior Publication Data

US 2022/0007222 A1 Jan. 6, 2022

Related U.S. Application Data

(63) Continuation of application No. 16/722,110, filed on Dec. 20, 2019, now Pat. No. 11,197,181.

(51) Int. Cl.
*H04W 24/08* (2009.01)
*H04W 12/02* (2009.01)
*H04W 72/542* (2023.01)

(52) U.S. Cl.
CPC .......... *H04W 24/08* (2013.01); *H04W 12/02* (2013.01); *H04W 72/542* (2023.01)

(58) Field of Classification Search
CPC ..... H04W 24/08; H04W 24/02; H04W 12/02; H04W 72/085; H04W 16/02
See application file for complete search history.

(56) References Cited

U.S. PATENT DOCUMENTS 7,533,133 B1 5/2009 Lanzatella et al.
8,839,384 B2 9/2014 Roy et al.
(Continued)

FOREIGN PATENT DOCUMENTS

WO 2015197537 A1 12/2015
WO WO-2015197537 A1 * 12/2015 ............ H04W 16/14
WO 2019066882 A1 4/2019

OTHER PUBLICATIONS

Wirelessinnovation, "Requirements for Commercial Operation in the U.S. 3550-3700 MHz Citizens Broadband Radio Service Band", Document WINNF-15-S-0112, https://www.wirelessinnovation.org/assets/work_products/Specifications/winnf-15-s-0112-v1.0.0%20cbrs%20operational%20and%20functional%20requirements.pdf, May 12, 2016, 41 pages.

(Continued)

*Primary Examiner* — Hassan Kizou
*Assistant Examiner* — Hector Reyes
(74) *Attorney, Agent, or Firm* — Edell, Shapiro & Finnan, LLC

(57) ABSTRACT

Presented herein are methodologies for managing a citizens broadband radio service (CBRS) network. The methodology includes receiving, at an enterprise controller, measurement information from a first user equipment (UE) and a second UE, wherein the first UE and the second UE operate in a citizens broadband radio service (CBRS) network; selecting, at the enterprise controller, an information aggregation level based on a predetermined level of privacy associated with the first UE and the second UE; aggregating, at the enterprise controller, the measurement information from the first UE and the second UE in accordance with the information aggregation level to obtain aggregated measurement information; and sending, by the enterprise controller, the aggregated measurement information to a Spectrum Access Sys- (Continued)

tem that controls allocation of resources in the CBRS network for the first UE and the second UE.

20 Claims, 4 Drawing Sheets

(56) References Cited

U.S. PATENT DOCUMENTS

| | | | | |
|---|---|---|---|---|
| 2015/0181449 | A1* | 6/2015 | Didenko | H04W 24/10 455/67.11 |
| 2018/0035301 | A1 | 2/2018 | Nama et al. | |
| 2018/0132111 | A1 | 5/2018 | Mueck et al. | |
| 2018/0288620 | A1* | 10/2018 | Jayawickrama | H04W 16/14 |
| 2018/0376342 | A1 | 12/2018 | MacMullan et al. | |
| 2019/0058999 | A1 | 2/2019 | Gunasekara et al. | |
| 2019/0223037 | A1* | 7/2019 | Raghothaman | H04W 72/542 |
| 2019/0335337 | A1 | 10/2019 | Damnjanovic et al. | |
| 2020/0059802 | A1 | 2/2020 | Singh | |
| 2020/0288324 | A1 | 9/2020 | Ford et al. | |
| 2021/0076223 | A1 | 3/2021 | Taneja et al. | |

OTHER PUBLICATIONS

Parvez et al., "CBRS Spectrum Sharing Between LTE-U and WIFI: A Multiarmed Bandit Approach," Mobile Information Systems, vol. 2016, Article ID 5909801, https://www.hindawi.com/journals/misy/2016/5909801/, Jul. 19, 2016, pp. 1-13.

CBRS Alliance, "OnGo Wireless Coverage—In-Building, Public Space & Industrial IoT", https://www.cbrsalliance.org/, downloaded Nov. 8, 2019, 5 pages.

The Wireless Innovation Forum, "Welcome to the Wireless Innovation Forum", https://www.wirelessinnovation.org/, downloaded Nov. 8, 2019, 2 pages.

Du Ho Kang et al., "Coexistence Performance of GAA Use Cases using LTE-TDD Technologies in 3.5GHz CBRS Spectrum", 2018 IEEE International Symposium on Dynamic Spectrum Access Networks (DySPAN), Oct. 2018, https://ieeexplore.ieee.org/document/8610475, 2 pages.

Matthew Tonnemacher et al., "Opportunistic Channel Access Using Reinforcement Learning in Tiered CBRS Networks", 2018 IEEE International Symposium on Dynamic Spectrum Access Networks (DySPAN), Oct. 2018, https://ieeexplore.ieee.org/document/8610474, 3 pages.

Wireless Innovation Forum, "Signaling Protocols and Procedures for Citizens Broadband Radio Service (CBRS): WInnForum Recognized CBRS Air Interfaces and Measurements", Document WINNF-17-SSC-0002, Version 2.0.1, The Software Defined Radio Forum Inc., Jun. 22, 2017, 8 pages.

Wireless Innovation Forum, "Signaling Protocols and Procedures for Citizens Broadband Radio Service (CBRS): Spectrum Access System (SAS)—Citizens Broadband Radio Service Device (CBSD) Interface Technical Specification", Document WINNF-TS-0016, Version V1.2.4, The Software Defined Radio Forum Inc., Jun. 26, 2019, 60 pages.

"Signaling Protocols and Procedures for Citizens Broadband Radio Service (CBRS): WInnForum Recognized CBRS Air Interfaces and Measurements," The Software Defined Radio Forum, Inc. Wireless Innovation Forum, Document WINNF-17-SSC-0002, Version 2.0.1, Jun. 22, 2017, 8 pages.

* cited by examiner

Privacy level of III) Cell specific >> (i.e. greater than) II) Zone specific >> I) UE specific

| | | I) UE specific | II) Zone specific | III) Cell specific |
|---|---|---|---|---|
| UE specific | Location of UE (e.g. GPS coordinates) | Y | -- | -- |
| | State of that UE (e.g., (Radio Resource Control) RRC-Connected, RRC-Idle) at a given time and measurements given to a CBSD with which UE is connected | Y | -- | -- |
| | Average Rx power measured by that UE over different CBRS channels (over a given time interval) and related parameters (such as LTE eNodeB identity, PCI detected if any) | Y | -- | -- |
| | Interference experienced by that UE over different CBRS channels and related parameters (such as LTE eNodeB identity) – measured value or classified as 00: high, 01: medium, 10:low | Y | -- | -- |
| | Average Tx power used by that UE over a given time interval | Y | -- | -- |
| | Radio Access Technology (RATs) supported by that UE (e.g. 01: CBRS only, 11: CBRS and WiFi 6, etc.) | Y | -- | -- |
| Zone level (e.g., UE location coordinates etc. kept private) (measurements aggregated at zone level) | Location of UE in terms of zone around that CBSD (e.g. 00: nearby zone, 01: middle zone, 10: far away zone) | Y | Y | -- |
| | Number of UEs in each zone (with reference to a CBSD) | Y | Y | -- |
| | Average Rx power measured by that UE over different CBRS channels (over a given time interval): i) Taken aggregate average for all UEs for each zone, or ii) specify ranges for power level, e.g., m1 UEs with avg power level between (p1, p2) for channel c1, etc. | Y | Y | -- |
| | Interference experienced by that UE over different CBRS channels (over a given time interval) – measured value or classified as 00: high, 01: medium, 10: low – Taken as aggregate average for all UEs in that zone | Y | Y | -- |
| | Average Tx power used by that UE over a given time interval – derived for all UEs in a zone (as explained for Rx power) | Y | Y | -- |
| | RATs supported by that UE (e.g. 01: CBRS only, 11: CBRS and WiFi 6, etc.) – zone level statistics (e.g., number of UEs that support CBRS only, number that support CBRS and WiFi 6, etc.) | Y | Y | -- |
| Cell level aggregation of information | Zone level info not provided for each UE. Above measures aggregated at cell level provided | Y | Y | Y |

FIG.2

CITIZEN BROADBAND RADIO SERVICE (CBRS) NETWORK PERFORMANCE WHILE TAKING INTO ACCOUNT PRIVACY PREFERENCES

This application is a continuation of U.S. patent application Ser. No. 16/722,110, filed Dec. 20, 2019, the substance of which is incorporated herein by reference in its entirety.

TECHNICAL FIELD

The present disclosure relates to the operation of a Citizen Broadband Radio Service network, and particularly to managing resource allocation in such a network.

BACKGROUND

Citizen Broadband Radio Service (CBRS) is a 150 MHz wide broadcast band in the 3550-3700 MHz frequency range, time division-long term evolution (TD-LTE) band 48. Access to spectrum in the CBRS band is through the use of a Spectrum Access System (SAS), which protects incumbents from interference from lower tier priority access license (PAL) and general authorized access (GAA) users, and protects PAL users from interference from other PAL users and GAA users. The SAS maintains a database of spectrum usage (by incumbent, PAL, and GAA users) in all census tracts (or areas) and allocates channels to CBRS Base Station Devices (CBSDs) (i.e., access points (APs)) using variety of rules including the following.

Tier 1 users: incumbents (such as navy ships, military radars and fixed satellite service earth stations) are allowed access to all the channels.

Tier 2 users: PAL users are granted access in the 3550-3650 MHz band and are allowed to use a maximum of 710 MHz channels in a census tract (or an area). No licensee can take more than 4 PAL channels in a census tract.

Tier 3 users: GAA users are allowed access to all the channels but only the ones not being used by above users.

The SAS may consider multiple factors (such as those above) to determine appropriate spectrum allocation, and, in turn, informs CBSDs of operating parameters (such as frequency band or channel, and maximum Effective Isotropic Radiated Power (EIRP)) that the CBSDs can use (i.e., to employ with User Equipment (UE)) at a given point in time. In some implementations, CBSDs, CBRS client devices (e.g., CBRS UEs), and an Evolved Packet Core (EPC) may be deployed as part of a private enterprise. Such a deployment can present several challenges, as well as some advantages.

BRIEF DESCRIPTION OF THE DRAWINGS

FIG. 2 is a table showing three measurement report levels respectively corresponding to UE-specific, zone-specific and cell-specific reports in accordance with an example embodiment.

DESCRIPTION OF EXAMPLE EMBODIMENTS

Overview

Presented herein are methodologies for managing a Citizens Broadband Radio Service (CBRS) network. The methodology includes receiving, at a controller, measurement information from a first user equipment (UE) and a second UE, wherein the first UE and the second UE operate in a Citizens Broadband Radio Service (CBRS) network; selecting, at the controller, an information aggregation level based on a predetermined level of privacy associated with the first UE and the second UE; aggregating, at the controller, the measurement information from the first UE and the second UE in accordance with the information aggregation level to obtain aggregated measurement information; and sending, by the controller, the aggregated measurement information to a Spectrum Access System that controls allocation of resources in the CBRS network for the first UE and the second UE.

A device or apparatus is also described. The device may include an interface unit configured to enable network communications, a memory, and one or more processors coupled to the interface unit and the memory, and configured to: receive measurement information from a first user equipment (UE) and a second UE, wherein the first UE and the second UE operate in a Citizens Broadband Radio Service (CBRS) network; select an information aggregation level based on a predetermined level of privacy associated with the first UE and the second UE; aggregate the measurement information from the first UE and the second UE in accordance with the information aggregation level to obtain aggregated measurement information; and send the aggregated measurement information to a Spectrum Access System that controls allocation of resources in the CBRS network for the first UE and the second UE.

Example Embodiments

Figure 1:
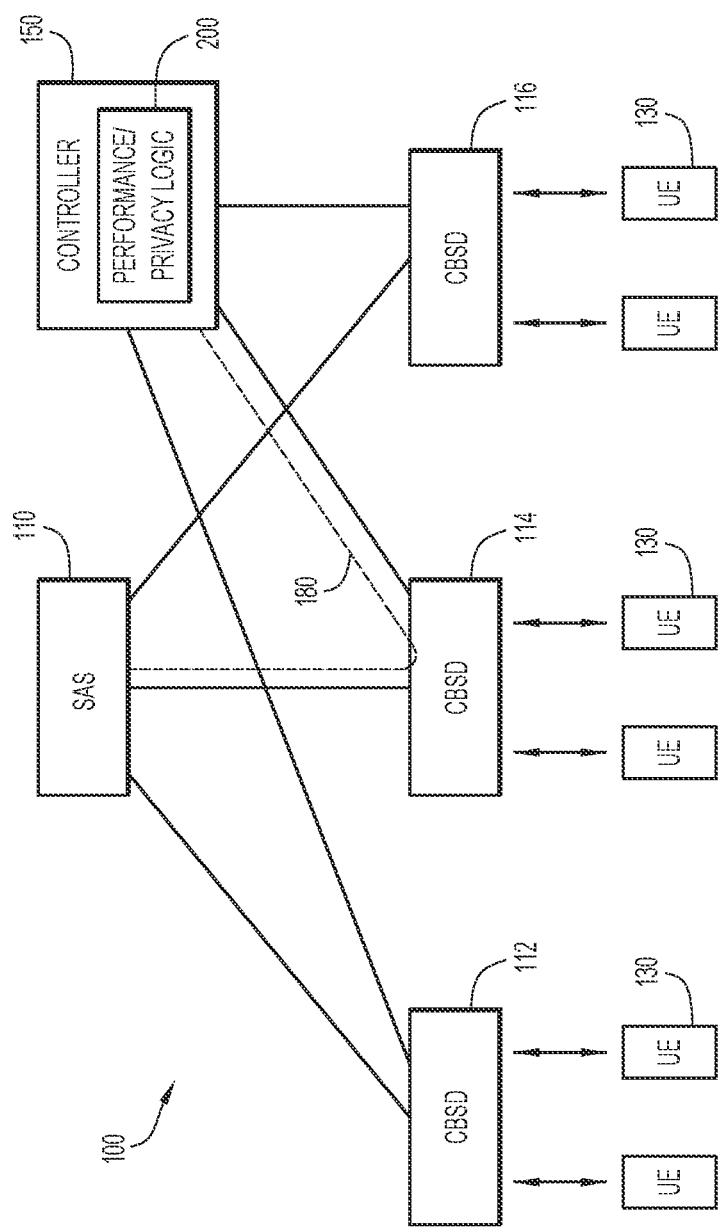
FIG. 1 shows a CBRS network topology including performance/privacy logic hosted by a controller in accordance with an example embodiment.

FIG. 1 shows a CBRS network topology including performance/privacy logic hosted by a controller in accordance with an example embodiment. As shown, a CBRS network 100 includes a Spectrum Access System (SAS) 110 that is in communication with one or more CBRS Base Station Devices (CBSDs) (or access points (APs)) 112, 114, 116. The CBSDs may, in turn, be in communication with respective user equipment (UEs) 130. A controller 150, such as a digital network application controller (DNA-C), which may be operated by an enterprise entity, such as a private company, and be separately controlled and managed from the SAS 110, is also separately in communication with the CBSDs 112, 114, 116. Controller 150 hosts performance/privacy logic 200, the function of which will be explained in detail below. Controller 150 may also be considered to an enterprise controller.

In CBRS network 100, measurement related information may be exchanged between CBSDs 112, 114, 116 and SAS 110 during, e.g., the following procedures:

(1) Registration procedure: a CBSD to SAS Registration Request message includes a measurement capability object identifying measurement reporting capabilities of the CBSD. A Registration response message from SAS to CBSD includes measReportConfig indicating that measurement reports may be sent to SAS.

(2) Spectrum enquiry procedure: CBSD sends a request to SAS that includes CBSD Id, enquired frequency band and a measurement report. SAS provides available channel ids to CBSD if this procedure is successful.

(3) Grant request procedure: Grant request message that is sent from CBSD to SAS includes CBSD Id, operational parameters and measurement reports. Grant response message includes measReportConfig along with other objects.

In addition, heartbeat messages exchanged between CBSD and SAS may also include measReport and measReportConfig objects.

WINNF-17-SSC-0002 includes the following measurement types for CBSD:

(1) 'RECEIVED_POWER' which has associated measurement capabilities RECEIVED_POWER_WITHOUT_GRANT (i.e., when CBSD has not received a spectrum grant from the SAS, e.g., with spectrum enquiry messages and with first grant request message) and 'RECEIVED_POWER_WITH_GRANT (i.e., when CBSD has received a spectrum grant from the SAS).

(2) 'Indoor Loss': Measurement of indoor loss at physical location of CBSD and this is measured using a GNSS receiver embedded in the CBSD.

In a dense, multi-tenant environment, SAS 110 makes a variety of decisions regarding resource allocation, but the measurement reports listed above provide very limited support for such decisions.

If CBRS network 100 is running in an enterprise environment, as shown in FIG. 1, the enterprise CBRS provider, and particularly controller 150, has access to potentially more information about CBSDs 112, 114, 116 and UEs 130 that can be useful for SAS 110, but may not be provided to SAS 110 due to privacy preferences and/or performance overhead considerations.

The embodiments described herein, implemented in part by performance/privacy logic 200, may provide an optimized balance among measurement reports, performance, and privacy concerns.

As noted, enterprise CBRS providers may provide very limited measurement related information to SAS 110. However, such information could be useful to SAS 110 to complement information SAS 110 already receives. An enterprise CBRS provider (and even specific users within a given enterprise) may want to enhance network performance, but not necessarily at the expense of privacy preferences.

In this regard, it is noted that different enterprise CBRS providers can have different priority preferences. An enterprise CBRS provider A can have different preferences compared to enterprise CBRS provider B and each of them may still have a different set of preferences compared to a service provider (e.g., a non-enterprise) CBRS provider. Some CBRS providers may decide privacy preferences for all their users (and thus for that network) while some CBRS providers may allow CBRS end-devices (i.e., UEs) to specify their own privacy preferences.

In accordance with one embodiment, performance/privacy logic 200 is configured to collect or receive privacy preferences for measurement in two possible ways. First, an enterprise CBRS provider can provide privacy preferences for a whole network under its control (i.e., for each CBSD and UE). Second, and alternatively, an enterprise CBRS provider can provide privacy preferences for selected CBRS devices (i.e., CBSDs and UEs) and any remaining CBRS devices can directly provide their preferences to performance/privacy logic 200. Either way, performance/privacy logic 200 learns the privacy preferences of CBRS devices in a given enterprise network, such as CBRS network 100.

In accordance with an embodiment, performance/privacy logic 200 analyses the received or collected privacy preference information (i.e., level of desired privacy) and, perhaps, still other parameters (e.g., related to network topology, performance parameters, etc.) and determines a measurement report level that should be used when providing measurement reports to SAS 110.

In one possible implementation, three measurement report levels are defined: UE-specific, zone-specific and cell-specific, as shown in the table of FIG. 2. That is, performance/privacy logic 200 may be directed or be configured to supply different levels of measurement reports based on the privacy preference information received (i.e., permit UE-specific information sharing, permit only zone level information sharing, or permit only cell level information sharing). As can be seen from the table of FIG. 2, and as an example, UE location information may be shared at UE-specific level information sharing, but that specific level of information (or granularity) may not be shared in zone-level information.

Performance/privacy logic 200 may also decide on a frequency of when a measurement report might be shared with SAS 110 (also, possibly, taking into account relative importance of the measurement information and possibly other network parameters) that might be useful in improving resource allocation decisions. The measurement reports themselves may be provided by controller 150 via one of the CBSDs, e.g., CBSD 114, depicted as link 180 in FIG. 1. Performance/privacy logic 200 may also make suggestions to SAS 110 about how to interpret the measurement report being supplied. In another embodiment, performance/privacy logic 200 may analyze the measurement information to decide when a given CBSD should send an unsolicited measurement report to SAS 110.

As noted, each enterprise CBRS provider or each CBRS device may have different privacy preferences. Some providers may be willing to disclose additional information (such as location coordinates of UEs, average received power measured by these UEs for different channels, interference experienced by a UE on each CBRS channel, average transmit power used by a UE, etc.) while other providers may want to provide very limited information. The measurement report levels illustrated in FIG. 2 enable performance/privacy logic 200 to select an appropriate or suitable (predetermined, or custom) level for a given CBRS provider deployment.

More specifically, in one implementation, performance/privacy logic 200 solicits each CBRS provider to choose one of the aforementioned measurement report levels: I) UE-specific, II) zone specific, III) cell specific, as illustrated in FIG. 2, or IV) none. For example, for level-II (i.e., zone specific), performance/privacy logic 200 does not share location coordinates of each UE to SAS 110, but instead provides aggregate information at a zonal level (e.g., for predetermined zone (e.g., diameters) around a CBSD). For example, for measured received power by each UE in a zone (for level II), performance/privacy logic 200 either computes an average of measured power by each UE in that zone, or performance/privacy logic 200 provides a number of UEs in that zone for which received power level on a channel is in certain range (e.g., m1 UEs with average received power level between p1 and p2, m2 UEs with average received power level between p2 and p3, etc.), and performance/privacy logic 200 may compute these metrics for each CBRS channel. For level-III, performance/privacy logic 200 may perform cell level aggregation of measurement information. For level-IV, no additional measurement information is provided by controller 150, or at the direction of controller 150 (i.e., by directing a CBSD to supply measurement information).

As an alternate approach, performance/privacy logic 200 may allow each UE 130 to specify whether or not it wants to share any additional measurement information and, if so, may query each UE to choose a privacy level—I), II) or III). In the case of different UEs selecting different levels of privacy, performance/privacy logic 200 may inform SAS 110 that a certain number of CBRS UEs elected not to share information. Performance/privacy logic 200 need not provide a specific number, but may instead specify a range for that number. As CBRS devices provide measurement information via controller 150, SAS 110 may be able to provide improved performance for that CBRS network. Also, in one possible implementation, users may be given incentives (improved connectivity, bandwidth, financial, etc.) to share measurement information.

In another embodiment, performance/privacy logic 200 can reduce performance (bandwidth) overhead due to supplying the measurement information, and still further improve the privacy level for levels I to III. Specifically, performance/privacy logic 200 may implement a functional block that converts the measurement information to an "aggregate measurement indicator" (AMI). Precisely how the functional block operates may be known only to performance/privacy logic 200, and performance/privacy logic 200 may provide "hints" to SAS 110 (via, e.g., 180) as to how to interpret or act on the AMI to execute resource allocation and other related decisions. For example, performance/privacy logic 200 may provide a hint that if the AMI is above a certain level then it can be assumed that there are more than 50% of UEs that are experiencing a high level of interference in the CBRS band (or on selected channels). By using an AMI, performance/privacy logic 200 can reduce the amount of information being supplied to SAS 110 and provide a still further level of privacy for UEs and CBSDs.

Thus, as explained, performance/privacy logic 200 is configured to obtain privacy preferences from CBRS providers and/or CBRS devices (including UEs) for providing measurement parameters to SAS 110.

These privacy preferences are analyzed and a suitable measurement report format is selected based on the privacy preferences.

Performance/privacy logic 200 may also analyze various parameters and estimate a desired measurement frequency for such parameters, and thereafter inform CBSDs, UEs (via CBSDs), and SAS (via a CBSD) regarding that frequency.

Performance/privacy logic 200 may also define and implement predetermined levels of privacy, e.g., UE-specific, zone-specific and cell-specific levels.

Performance/privacy logic 200 may also be configured to compute an aggregate measurement indicator (AMI) based on the measurement reports, and SAS 110 may in turn only be supplied with the AMI. Such an approach can also increase privacy, and reduce overhead. As part of this approach, performance/privacy logic 200 may be configured to provide a hint or hint(s) to SAS 110 regarding how to interpret and/or act on the AMI in regard to resource allocation decisions.

In still another embodiment, SAS 110 can propose a method to compute the AMI from the measurement parameters, and SAS 110 and performance/privacy logic 200 can further negotiate whether to use the method proposed by SAS or one proposed by performance/privacy logic 200.

Figure 3:
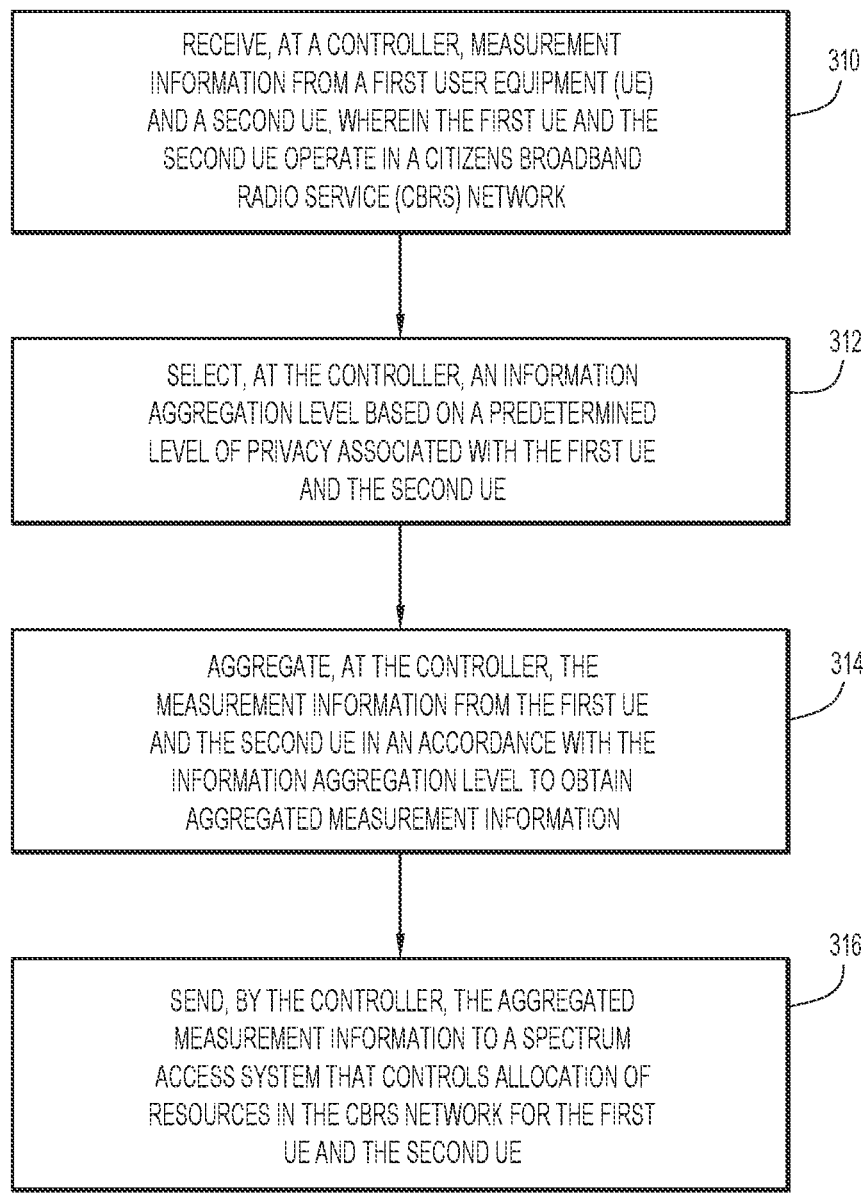
FIG. 3 is a flow chart depicting a series of operations that may be executed by performance/privacy logic in accordance with an example embodiment.

FIG. 3 is a flow chart depicting a series of operations that may be executed by performance/privacy logic 200 in accordance with an example embodiment. At 310, the logic may be configured to receive measurement information from a first user equipment (UE) and a second UE, wherein the first UE and the second UE operate in a Citizens Broadband Radio Service (CBRS) network. At 312, the logic may be configured to select an information aggregation level based on a predetermined level of privacy associated with the first UE and the second UE. At 314, the logic may be configured to aggregate the measurement information from the first UE and the second UE in accordance with the information aggregation level to obtain aggregated measurement information. And, at 316, the logic may be configured to send the aggregated measurement information to a Spectrum Access System that controls allocation of resources in the CBRS network for the first UE and the second UE.

While the approach described herein has been described in the context of CBRS, those skilled in the art will appreciate that resource allocation in other radio services in the same or other frequency spectrum can also take advantage of the same or similar techniques.

Figure 4:
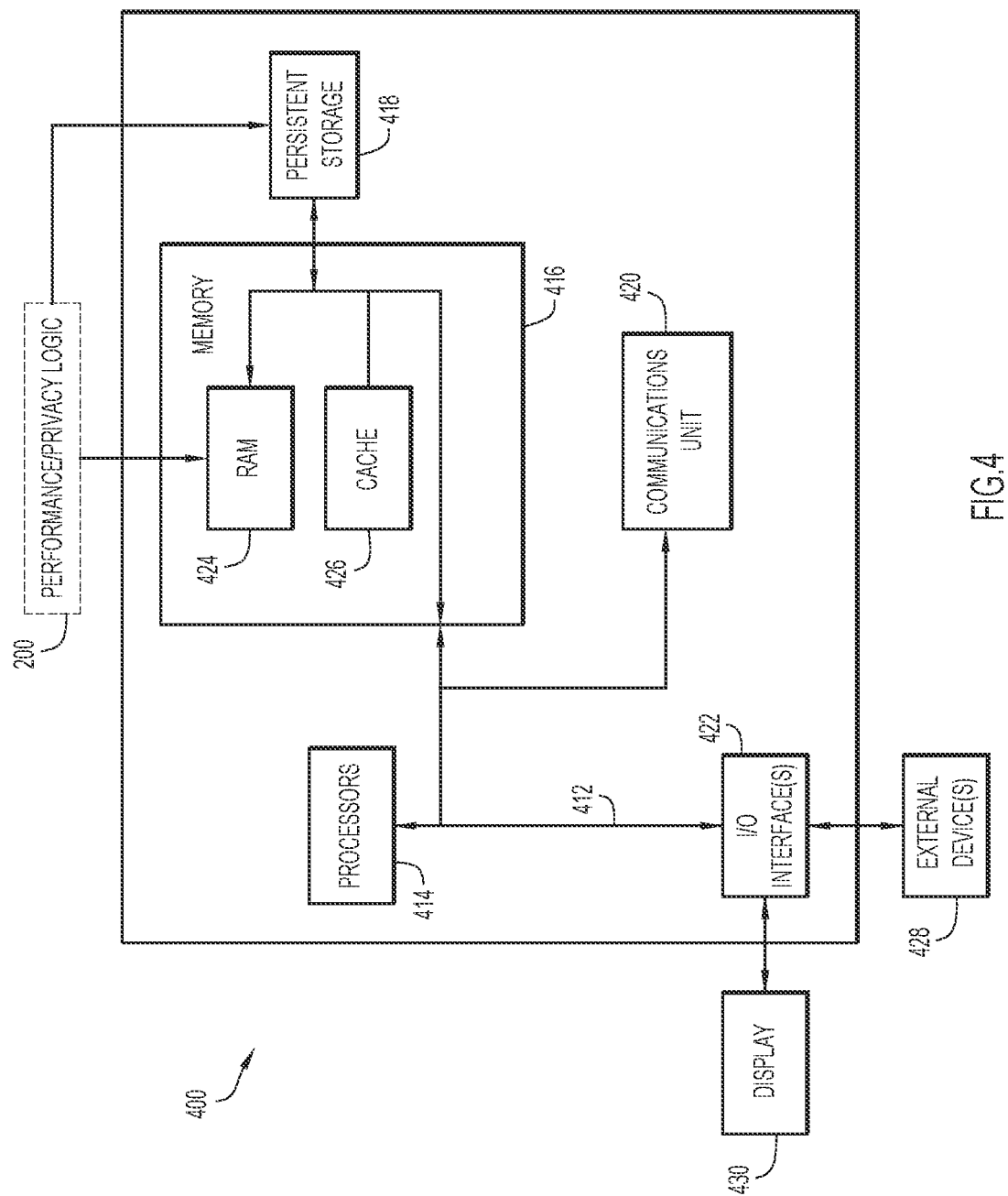
FIG. 4 depicts a device (e.g., a controller) that executes performance/privacy logic in accordance with an example embodiment.

FIG. 4 depicts a device 400 (e.g., a SAS or external controller) that executes performance/privacy logic 200 in accordance with an example embodiment. It should be appreciated that FIG. 4 provides only an illustration of one embodiment and does not imply any limitations with regard to the environments in which different embodiments may be implemented. Many modifications to the depicted environment may be made. Indeed, in many implementations of a controller configured to host performance/privacy logic 200, much of the hardware described below may not be needed.

As depicted, the device 400 includes a bus 412, which provides communications between computer processor(s) 414, memory 416, persistent storage 418, communications unit 420, and input/output (I/O) interface(s) 422. Bus 412 can be implemented with any architecture designed for passing data and/or control information between processors (such as microprocessors, communications and network processors, etc.), system memory, peripheral devices, and any other hardware components within a system. For example, bus 412 can be implemented with one or more buses.

Memory 416 and persistent storage 418 are computer readable storage media. In the depicted embodiment, memory 416 includes random access memory (RAM) 424 and cache memory 426. In general, memory 416 can include any suitable volatile or non-volatile computer readable storage media. Instructions for the performance/privacy logic 200 may be stored in memory 416 or persistent storage 418 for execution by processor(s) 414.

One or more programs may be stored in persistent storage 418 for execution by one or more of the respective computer processors 414 via one or more memories of memory 416. The persistent storage 418 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 418 may also be removable. For example, a removable hard drive may be used for persistent storage 418. Other examples include optical and magnetic disks, thumb drives, and smart cards that are inserted into a drive for transfer onto another computer readable storage medium that is also part of persistent storage 418.

Communications unit 420, in these examples, provides for communications with other data processing systems or devices. In these examples, communications unit 420 includes one or more network interface cards. Communications unit 420 may provide communications through the use of either or both physical and wireless communications links.

I/O interface(s) 422 allows for input and output of data with other devices that may be connected to computer device 400. For example, I/O interface 422 may provide a connection to external devices 428 such as a keyboard, keypad, a touch screen, and/or some other suitable input device. External devices 428 can also include portable computer readable storage media such as database systems, thumb drives, portable optical or magnetic disks, and memory cards.

Software and data used to practice embodiments can be stored on such portable computer readable storage media and can be loaded onto persistent storage 418 via I/O interface(s) 422. I/O interface(s) 422 may also connect to a display 430. Display 430 provides a mechanism to display data to a user and may be, for example, a computer monitor.

The programs described herein are identified based upon the application for which they are implemented in a specific embodiment. However, it should be appreciated that any particular program nomenclature herein is used merely for convenience, and thus the embodiments should not be limited to use solely in any specific application identified and/or implied by such nomenclature.

Data relating to operations described herein may be stored within any conventional or other data structures (e.g., files, arrays, lists, stacks, queues, records, etc.) and may be stored in any desired storage unit (e.g., database, data or other repositories, queue, etc.). The data transmitted between entities may include any desired format and arrangement, and may include any quantity of any types of fields of any size to store the data. The definition and data model for any datasets may indicate the overall structure in any desired fashion (e.g., computer-related languages, graphical representation, listing, etc.).

The present embodiments may employ any number of any type of user interface (e.g., Graphical User Interface (GUI), command-line, prompt, etc.) for obtaining or providing information (e.g., data relating to scraping network sites), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The environment of the present embodiments may include any number of computer or other processing systems (e.g., client or end-user systems, server systems, etc.) and databases or other repositories arranged in any desired fashion, where the present embodiments may be applied to any desired type of computing environment (e.g., cloud computing, client-server, network computing, mainframe, stand-alone systems, etc.). The computer or other processing systems employed by the present embodiments may be implemented by any number of any personal or other type of computer or processing system (e.g., desktop, laptop, PDA, mobile devices, etc.), and may include any commercially available operating system and any combination of commercially available and custom software (e.g., machine learning software, etc.). These systems may include any types of monitors and input devices (e.g., keyboard, mouse, voice recognition, etc.) to enter and/or view information.

It is to be understood that the software of the present embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present embodiments may alternatively be implemented by any type of hardware and/or other processing circuitry.

Each of the elements described herein may couple to and/or interact with one another through interfaces and/or through any other suitable connection (wired or wireless) that provides a viable pathway for communications. Interconnections, interfaces, and variations thereof discussed herein may be utilized to provide connections among elements in a system and/or may be utilized to provide communications, interactions, operations, etc. among elements that may be directly or indirectly connected in the system. Any combination of interfaces can be provided for elements described herein in order to facilitate operations as discussed for various embodiments described herein.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present embodiments may be distributed in any manner among the various end-user/client and server systems, and/or any other intermediary processing devices. The software and/or algorithms described above and illustrated in the flow charts may be modified in any manner that accomplishes the functions described herein. In addition, the functions in the flow charts or description may be performed in any order that accomplishes a desired operation.

The software of the present embodiments may be available on a non-transitory computer useable medium (e.g., magnetic or optical mediums, magneto-optic mediums, floppy diskettes, CD-ROM, DVD, memory devices, etc.) of a stationary or portable program product apparatus or device for use with stand-alone systems or systems connected by a network or other communications medium.

The communication network may be implemented by any number of any type of communications network (e.g., LAN, WAN, Internet, Intranet, VPN, etc.). The computer or other processing systems of the present embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other databases, data stores or storage structures (e.g., files, databases, data structures, data or other repositories, etc.) to store information. The database system may be implemented by any number of any conventional or other databases, data stores or storage structures (e.g., files, databases, data structures, data or other repositories, etc.) to store information. The database system may be included within or coupled to the server and/or client systems. The database systems and/or storage structures may be remote from or local to the computer or other processing systems, and may store any desired data.

The present embodiments may employ any number of any type of user interface (e.g., Graphical User Interface (GUI), command-line, prompt, etc.) for obtaining or providing information (e.g., data relating to providing enhanced delivery options), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The embodiments presented may be in various forms, such as a system, a method, and/or a computer program product at any possible technical detail level of integration. The computer program product may include a computer readable storage medium (or media) having computer readable program instructions thereon for causing a processor to carry out aspects of presented herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present embodiments may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Python, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects presented herein.

Aspects of the present embodiments are described herein with reference to flowchart illustrations and/or block diagrams of methods, apparatus (systems), and computer program products according to the embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In summary, in one form, a method is provided. The method includes receiving, at a controller, measurement information from a first user equipment (UE) and a second UE, wherein the first UE and the second UE operate in a citizens broadband radio service (CBRS) network; selecting, at the controller, an information aggregation level based on a predetermined level of privacy associated with the first UE and the second UE; aggregating, at the controller, the measurement information from the first UE and the second UE in accordance with the information aggregation level to obtain aggregated measurement information; and sending, by the controller, the aggregated measurement information to a Spectrum Access System that controls allocation of resources in the CBRS network for the first UE and the second UE.

In an embodiment, the method further includes receiving an indication of the predetermined level of privacy from the first UE and the second UE.

The method may also include receiving an indication of the predetermined level of privacy from an enterprise CBRS provider.

In one implementation, the information aggregation level is one of by UE, by zone or by cell.

In one embodiment, the information aggregation level by zone includes a number of UEs in the zone.

In an implementation, sending the aggregated measurement information to the Spectrum Access System includes sending the aggregated measurement information via a CBRS base station device (CBSD).

The operation of aggregating may include computing an aggregate measurement indicator.

In one implementation, the method may include sending to the Spectrum Access System a hint regarding how to interpret the aggregate measurement indicator.

In still another implementation, the method may further include receiving from the Spectrum Access System a proposed methodology for computing the aggregate measurement indicator.

In yet another implementation, the method may include selecting the proposed methodology for computing the aggregate measurement indicator for computing the aggregate measurement indicator.

In another form, a device may also be provided in accordance with an embodiment. The device may include an interface unit configured to enable network communications; a memory; and one or more processors coupled to the interface unit and the memory, and configured to: receive measurement information from a first user equipment (UE) and a second UE, wherein the first UE and the second UE operate in a citizens broadband radio service (CBRS) network; select an information aggregation level based on a predetermined level of privacy associated with the first UE and the second UE; aggregate the measurement information from the first UE and the second UE in accordance with the information aggregation level to obtain aggregated measurement information; and send the aggregated measurement information to a Spectrum Access System that controls allocation of resources in the CBRS network for the first UE and the second UE.

The one or more processors may be further configured to receive an indication of the predetermined level of privacy from the first UE and the second UE.

The one or more processors may be further configured to receive an indication of the predetermined level of privacy from an enterprise CBRS provider.

In an embodiment, the information aggregation level is one of by UE, by zone or by cell.

In one implementation the information aggregation level by zone includes a number of UEs in the zone.

In an embodiment, the one or more processors may be further configured to send the aggregated measurement information to the Spectrum Access System by sending the aggregated measurement information via a CBRS base station device (CBSD).

In another embodiment, the one or more processors may be further configured to compute an aggregate measurement indicator.

In still another form, a non-transitory computer readable storage media is provided that is encoded with instructions that, when executed by a processor, cause the processor to receive measurement information from a first user equipment (UE) and a second UE, wherein the first UE and the second UE operate in a citizens broadband radio service (CBRS) network; select an information aggregation level based on a predetermined level of privacy associated with the first UE and the second UE; aggregate the measurement information from the first UE and the second UE in accordance with the information aggregation level to obtain aggregated measurement information; and send the aggregated measurement information to a Spectrum Access System that controls allocation of resources in the CBRS network for the first UE and the second UE.

In an embodiment, the instructions, when executed by a processor, cause the processor to receive an indication of the predetermined level of privacy from the first UE and the second UE.

In another embodiment, the instructions, when executed by a processor, cause the processor to receive an indication of the predetermined level of privacy from an enterprise CBRS provider.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   receiving, at a controller, measurement information from a first user equipment (UE) and a second UE, wherein the first UE and the second UE operate in a wireless network;
   selecting, at the controller, an information aggregation level based on a predetermined level of privacy associated with the first UE and the second UE;
   aggregating, at the controller, the measurement information from the first UE and the second UE in accordance with the information aggregation level to obtain aggregated measurement information; and
   sending, by the controller, the aggregated measurement information to a resource allocation system that controls allocation of resources in the wireless network for the first UE and the second UE.

2. The method of claim 1, further comprising receiving an indication of the predetermined level of privacy from the first UE and the second UE.

3. The method of claim 1, further comprising receiving an indication of the predetermined level of privacy from an enterprise wireless network provider.

4. The method of claim 1, wherein the information aggregation level is one of by UE, by zone or by cell.

5. The method of claim 4, wherein the information aggregation level by zone includes a number of UEs in the zone.

6. The method of claim 1, wherein sending the aggregated measurement information to the resource allocation system comprises sending the aggregated measurement information via a wireless network base station device.

7. The method of claim 1, wherein the aggregating includes computing an aggregate measurement indicator.

8. The method of claim 7, further comprising sending to the resource allocation system a hint regarding how to interpret the aggregate measurement indicator.

9. The method of claim 7, further comprising receiving from the resource allocation system a proposed methodology for computing the aggregate measurement indicator.

10. The method of claim 9, further comprising selecting the proposed methodology for computing the aggregate measurement indicator for computing the aggregate measurement indicator.

11. A device comprising:
an interface unit configured to enable network communications;
a memory; and
one or more processors coupled to the interface unit and the memory, and configured to:
receive measurement information from a first user equipment (UE) and a second UE, wherein the first UE and the second UE operate in a wireless network;
select an information aggregation level based on a predetermined level of privacy associated with the first UE and the second UE;
aggregate the measurement information from the first UE and the second UE in accordance with the information aggregation level to obtain aggregated measurement information; and
send the aggregated measurement information to a resource allocation system that controls allocation of resources in the wireless network for the first UE and the second UE.

12. The device of claim 11, wherein the one or more processors are further configured to receive an indication of the predetermined level of privacy from the first UE and the second UE.

13. The device of claim 11, wherein the one or more processors are further configured to receive an indication of the predetermined level of privacy from an enterprise wireless network provider.

14. The device of claim 11, wherein the information aggregation level is one of by UE, by zone or by cell.

15. The device of claim 14, wherein the information aggregation level by zone includes a number of UEs in the zone.

16. The device of claim 11, wherein the one or more processors are further configured to send the aggregated measurement information to the resource allocation system by sending the aggregated measurement information via a wireless network base station device.

17. The device of claim 11, wherein the one or more processors are further configured to compute an aggregate measurement indicator.

18. A non-transitory computer readable storage media encoded with instructions that, when executed by a processor, cause the processor to:
receive measurement information from a first user equipment (UE) and a second UE, wherein the first UE and the second UE operate in a wireless network;
select an information aggregation level based on a predetermined level of privacy associated with the first UE and the second UE;
aggregate the measurement information from the first UE and the second UE in accordance with the information aggregation level to obtain aggregated measurement information; and
send the aggregated measurement information to a resource allocation system that controls allocation of resources in the wireless network for the first UE and the second UE.

19. The non-transitory computer readable storage media of claim 18, wherein the instructions, when executed by a processor, cause the processor to receive an indication of the predetermined level of privacy from the first UE and the second UE.

20. The non-transitory computer readable storage media of claim 18, wherein the instructions, when executed by a processor, cause the processor to receive an indication of the predetermined level of privacy from an enterprise wireless network provider.

* * * * *